J. B. DAVIS.
CASING FOR DISPENSING APPARATUS.
APPLICATION FILED APR. 17, 1915.
1,176,709.
Patented Mar. 21, 1916.
3 SHEETS—SHEET 2.
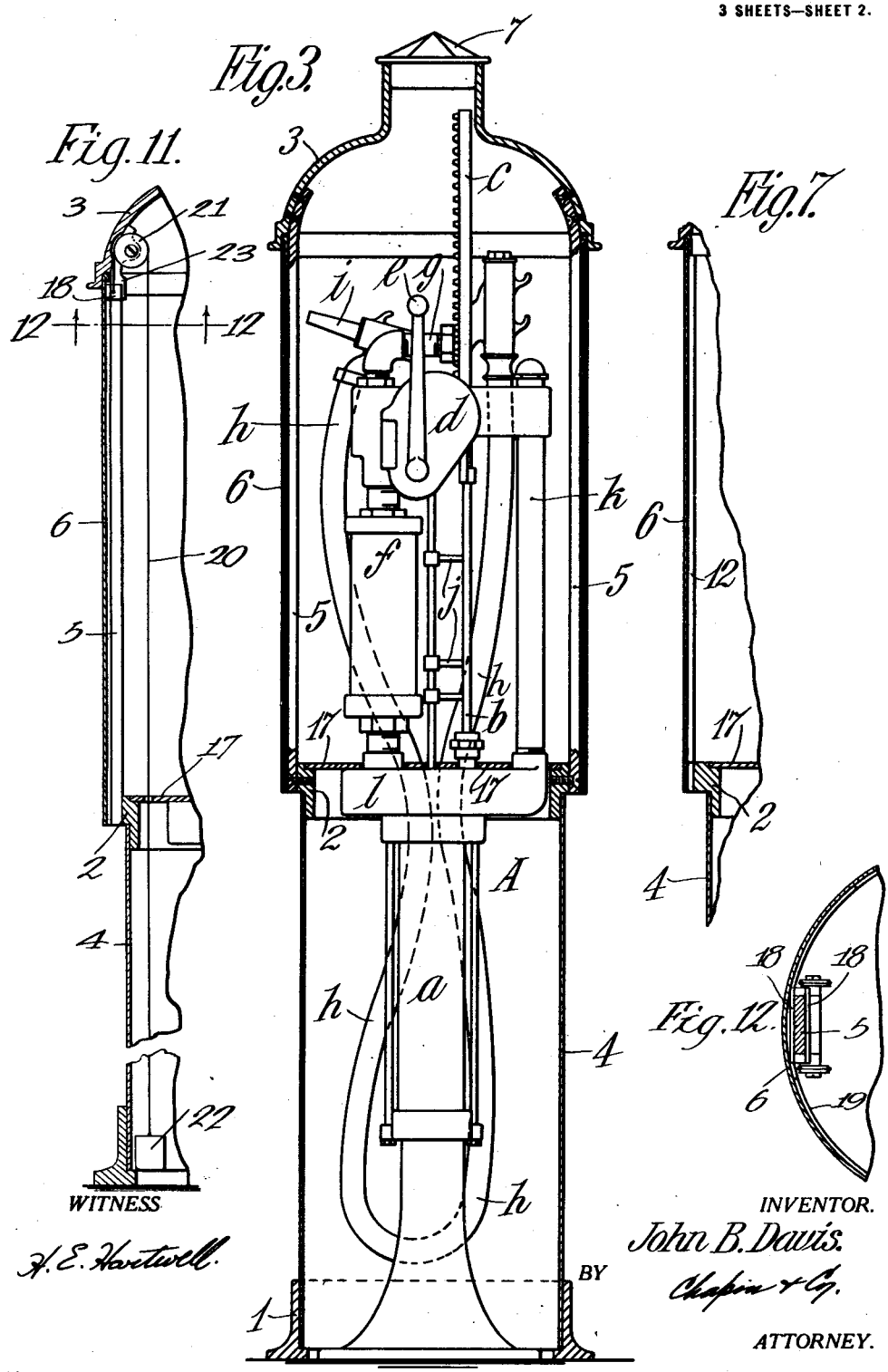
WITNESS
H. E. Hartwell
INVENTOR.
John B. Davis.
BY
Chapin & Co.
ATTORNEY.

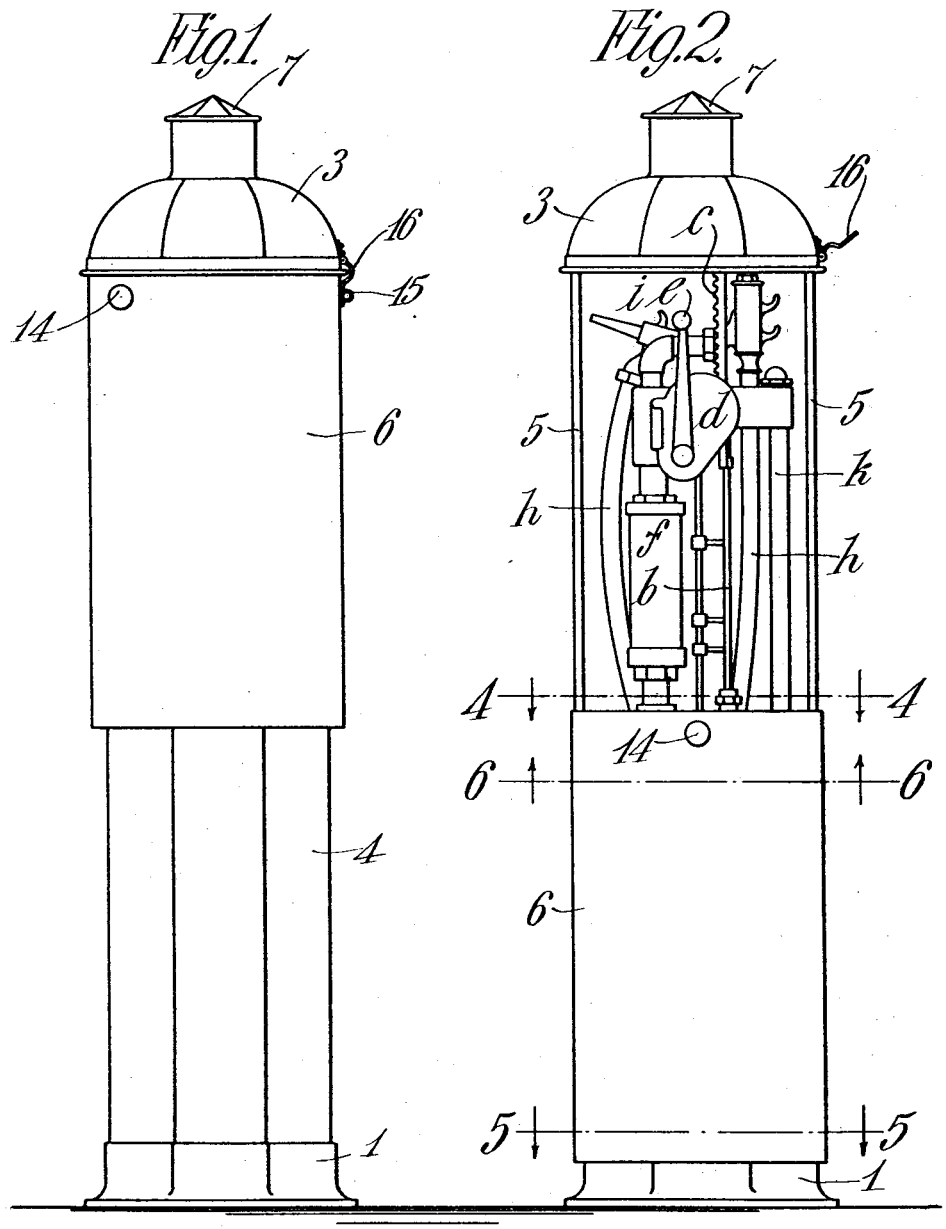

J. B. DAVIS.
CASING FOR DISPENSING APPARATUS.
APPLICATION FILED APR. 17, 1915.
1,176,709.
Patented Mar. 21, 1916.
3 SHEETS—SHEET 3.
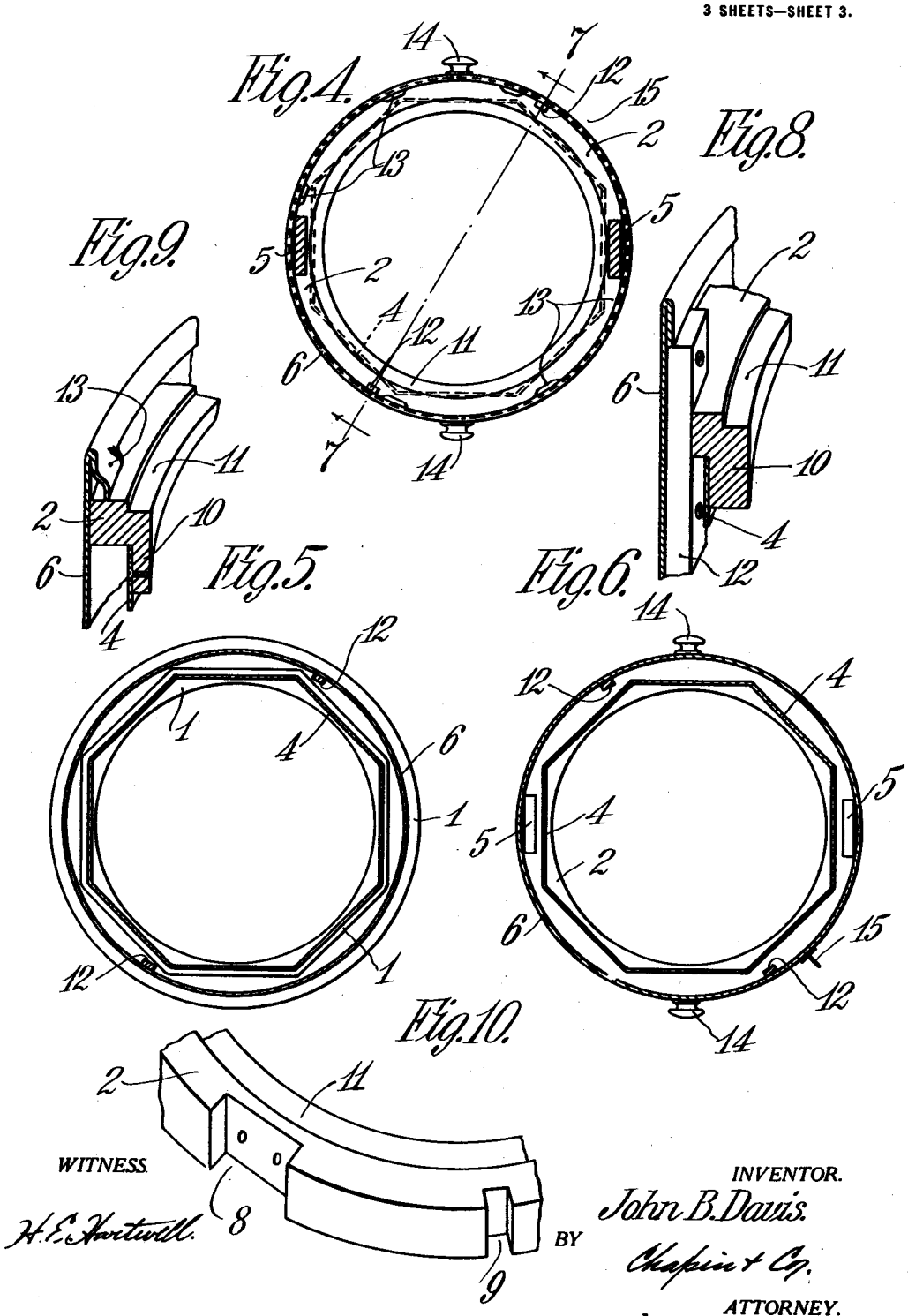
WITNESS
INVENTOR.
John B. Davis.
BY
ATTORNEY.

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

CASING FOR DISPENSING APPARATUS.

1,176,709.  Specification of Letters Patent.  Patented Mar. 21, 1916.

Application filed April 17, 1915. Serial No. 21,997.

*To all whom it may concern:*

Be it known that I, JOHN B. DAVIS, a citizen of the United States of America, residing in the city of Springfield, county of Hampden, and State of Massachusetts, have invented certain new and useful Improvements in Casings for Dispensing Apparatus, of which the following is a specification.

This invention relates to an improved casing for protecting a dispensing apparatus, such as a self-measuring pump, from the weather.

It is customary to locate dispensing apparatus for public convenience in exposed places. For example, a self-measuring pump, for dispensing gasolene for automobiles, is located on the curb or roadside where a large number of customers may be served with the greatest convenience. When the pump is not in use it should be protected against the weather.

The object of this invention is to provide a casing of improved construction for dispensing apparatus whereby the latter may be protected against the elements and still be operated to expose its contained apparatus for use when desired.

A more specific object of the invention is to provide a weather protective casing arranged in protecting parts which are dependently operable to telescope one on the other and expose and cover the parts of the dispensing apparatus necessarily accessible for their operation.

Another object of the invention is to provide a protective casing operable to expose and cover dispensing apparatus on all sides, comprising a pair of skirts, one of which may telescope over the other whereby it will be rendered substantially invisible and functionally inoperative.

Other objects of the invention will appear in the following description and annexed claims.

A preferred embodiment of my invention is shown for illustrative purposes in the accompanying drawings, in which—

Figure 1 is a front elevational view showing the exterior appearance of the casing when closed; Fig. 2 is a view similar to Fig. 1 showing the exterior appearance of the casing when opened; Fig. 3 is a sectional elevation on a somewhat larger scale and shows the interior construction of the casing and the arrangement of a pump therein; Fig. 4 is a sectional plan view taken on the line 4—4 of Fig. 2 and looking in the direction of the arrows; Fig. 5 is a sectional plan view taken on the line 5—5 of Fig. 2 and looking in the direction of the arrows; Fig. 6 is a sectional plan view taken on the line 6—6 of Fig. 2 and looking in the direction of the arrows; Fig. 7 is a partial sectional elevation taken on a plane indicated by the line 7—7 of Fig. 4 and looking in the direction of the arrow; Fig. 8 is a perspective view showing in detail a portion of the slidable shell and the guides therefor; Fig. 9 is a perspective view showing a portion of the slidable shell and the stops for limiting the downward movement thereof; Fig. 10 is a perspective view of a portion of the intermediate frame member; Fig. 11 is a fragmentary sectional elevation taken similarly to Fig. 3 and illustrating a means for counterbalancing the slidable shell, and Fig. 12 is a fragmentary sectional view taken on the line 12—12 of Fig. 11 and looking in the direction of the arrows.

Referring to these drawings and particularly to Figs. 3 to 6, inclusive, the casing has three transversely arranged frame members,—a base 1, an intermediate member 2, and an upper member or hood 3. The base 1 and intermediate member 2 are held together in spaced relation by an inclosing shell 4, and the intermediate member is connected by a pair of bars 5 to the hood 3. A tubular shell 6 is arranged, in a manner to be described, to be slidable over the bars 5 and intermediate member 2 and can occupy either of the positions shown in Figs. 1 and 2. The hood 3 has a central opening therein, which is shown closed by an ornamental cap 7 but which is arranged to receive any desired advertising device, such as an electric sign, for example.

The base 1 comprises a ring-shaped casting having upright flanges arranged in octagonal form, as clearly shown in Figs 3 and 5. The member 2 is likewise a ring-shaped casting which has depending flanges 10 arranged in octagonal form. Secured to and extending between these octagonally arranged flanges of the members 1 and 2 is a thin shell 4, preferably of sheet metal, which forms a hollow octagonal column to support the intermediate member 2. The upper portion of the latter is circular in shape and overhangs the shell 4, as shown in Figs. 3 and 4. Formed in the periphery of this circular portion at diametrically opposite points are a pair of notches 8, one of which is clearly shown in Fig. 10. Mounted in these notches and secured to the member 2, as shown in Fig. 3, are a pair of bars 5 which extend vertically upward in spaced parallel relation and are fastened by the screws shown to the inner surface of the hood 3.

Slidably arranged over the bars 5 is a cylindrical shell 6, which is equal in inside diameter to the outside diameter of the member 2. The bars 5 are mounted with their outer edges flush with the periphery of the member 2 to form suitable guides for the shell 6. Secured to the inner surface of the latter at diametrically opposite points are rectangular strips 12 which extend from the top of the shell 6 vertically downward to a position flush with the top of member 2, when the shell is in closed position as indicated in Fig. 7. The shell 6 is freely rotatable within limits, when in closed position, and the lower end of the strips 12 are adapted to rest upon the upper face of the intermediate member 2 to hold the shell in closed position. The member 2 has formed in its periphery a pair of slots 9 (see Fig. 10), which are arranged at diametrically opposite points and are angularly spaced from the slots 9. When the shell 6 is rotated, by suitable buttons 14 secured thereto, the strips 12 may be brought over the slots 9 and allowed to drop therethrough. Fig. 8 clearly shows a strip 12 in such a position and it will be seen that these strips 12 riding in the slots 9 serve to guide the shell 6 in its downward movement.

The upper end of the shell 6 has inwardly and downwardly turned portions, best seen in Fig. 8, which form a smooth finished edge. These portions, when the shell is in its uppermost position, rest in a circumferential recess in the under side of the hood 3, thereby preventing the entrance of water even in a driving rain. At intervals about the periphery of the shell (see Fig. 4) the inturned portions described are spread out as indicated at 13 in Fig. 9. These portions 13 form stops and are arranged to limit the downward movement of the shell 6 by abutment with the upper face of the intermediate member 2. Suitable provision for locking the shell 6, when in its upper position, is provided by a staple 15 secured to the shell and a hasp hinge 16 (see Figs. 1 and 2), which are arranged to receive a padlock in the well known manner. Thus, an improved hollow casing construction is provided within which any of the well known types of dispensing pumps or similar apparatus for outdoor use may be placed.

This casing is particularly arranged to be used with one of the many forms of commercial pumps. For the purposes of illustration, I have shown the outline of a dispensing pump commonly used in mills and garages, which is represented in general by the letter A. Such pumps are well known in the art and a brief description will, for the present purposes, be sufficient. The cylinder is represented at *a* and is located entirely within the shell 4. It will be noted that the pump is supported on a suitable base within and entirely independent of the base 1 of the casing.

*b* represents the piston rod and *c* a rack attached thereto, which latter is reciprocable through gears in the case *d*, operable by a crank handle *e*.

Gasolene to be dispensed is forced from the cylinder *a* upwardly through a manifold *l*, a suitable filter *f* to a distributing pipe *g*. The latter has connected thereto a hose *h*, which bears at its end a valve controlled nozzle *i*. Suitable measuring stops are indicated at *j*, which are arranged in a well known manner to limit the movement of the rack *c*.

*k* is an expansion pipe connected to the manifold *l*. All of the necessary operating elements of the pump are disposed above the intermediate member 2 and the remainder of the pump, to which access is not necessary, is below said member and within the shell 4. Suitable segmental cover plates 17 may be fitted around the parts of the pump as shown in Fig. 3 and a circumferential recess 11 is formed in the member 2 (see Fig. 9) to support these plates.

In operation, when the operator desires to open the casing, the shell 6 is turned by buttons 14 until the strips 12 come over the slots 9. The shell may then be lowered until the portions 13 abut the upper face of the member 2. The strips 12 and bars 5 serve to guide the shell in its downward passage in the manner already described. When the shell 6 is lowered as shown in Fig. 2, it will be seen that the operating parts of the pump A are completely accessible. There are no swinging doors to interfere with the movements of the operator and the bars 5 only remain, which are relatively small. Moreover, it will be seen from Fig. 3 that the hose *h* may be of unusual length, as it is not coiled up on the door in the customary way but is allowed to extend downwardly through a suitable opening in the plates 17 to the bottom of the shell 4.

When the casing is to be closed the shell 6 is raised and the strips 12 ride in the notches 9 until the shell has reached its uppermost position. The bottoms of the strips are then flush with the upper face of the member 2 and, when the shell 6 is turned, the bottom of these strips rest on the upper face of the member 2 to hold the shell 6 in closed position. The casing may then be locked if desired by the members 15 and 16 as described. If desired the weight of the shell 6 may be counterbalanced as shown in Figs. 11 and 12. A boxlike member 18 is slidably mounted on each bar 5 (one only being shown in the drawings), and the outer portion of this slide 18 is arranged to underlie and engage the inturned flange 19 of shell 6. Above the upper limit of travel of shell 6 are pulleys 21 pivotally mounted on opposite sides of bar 5. Cords 20, fixed at one end to slide 18, pass over pulleys 21, thence downwardly into the lower shell 4 and bear at their lower ends suitable weights 22. As shell 6 is pulled downwardly, the flange 19 thereof engages the slide 18 and lifts the weights 22 in an obvious manner. As the shell is subsequently raised, the weights 22 drop and lift slide 18. Just before shell 6 reaches its uppermost position, the slide 18 engages an abutment 23 on bar 5 so that the flange and slide are separated. Thus, shell 6 is free to be turned so that strips 12 bear upon the upper surface of member 2 without disturbing the counterbalancing apparatus.

The invention in one of its preferred forms has been described in detail and it is recognized that changes within the scope of the invention may be made as desired. The scope of the invention therefore is defined in the appended claims rather than by the foregoing specific description.

What I claim is:

1. A protective casing for outdoor dispensing apparatus, comprising, a base, a vertically arranged tubular shell thereon, a horizontally arranged flange connected to the top of said shell, a horizontally arranged cap member, skeleton means to support the latter above and in line with said shell, a second tubular shell, means at the top edge thereof to rest on said flange and support said second shell in telescoped relation to the first shell, means fastened to the second shell arranged to be guided by a slot in said flange, and having a shoulder at the bottom to rest on said flange, whereby the second shell may operate to connect said cap and first shell to form a complete closure.

2. A protective casing for outdoor dispensing apparatus, comprising, a base having a horizontally arranged flange, a tubular shell with its bottom edge resting on said flange, a horizontal casting having a flange on its outer bottom edge, the latter adapted to rest on the top edge of said shell, vertically arranged supporting arms fastened at opposite sides to said casting, a cap supported by said arms, a second tubular shell telescopically movable with respect to the first, a vertically arranged guide fastened on the inner surface thereof, adapted to register with a slot in said casting and a bottom shoulder adapted to rest on said flange to support said second shell, all constructed and arranged so that said second shell may be turned for the guide to register with said slot and be moved down and overlap the first mentioned shell or be moved upwardly and turned for support on said casting thereby to connect the first mentioned shell with said cap and form a complete closure therewith.

JOHN B. DAVIS.